United States Patent [19]

Nashiki et al.

[11] 4,433,261
[45] Feb. 21, 1984

[54] ROTOR FOR PERMANENT MAGNET TYPE SYNCHRONOUS MOTORS

[75] Inventors: Masayuki Nashiki; Yoshio Hamada, both of Nagoya, Japan

[73] Assignee: Kabushiki Kaisha Okuma Tekkosho, Nagoya, Japan

[21] Appl. No.: 473,342

[22] Filed: Mar. 8, 1983

[30] Foreign Application Priority Data

Mar. 24, 1982 [JP] Japan .................................. 57-46603

[51] Int. Cl.³ ............................................. H02K 21/14
[52] U.S. Cl. .................................... 310/156; 310/262; 310/271
[58] Field of Search ................................ 310/154–156, 310/261, 262, 265, 271

[56] References Cited

U.S. PATENT DOCUMENTS 3,671,788  6/1972  Knudson et al. .................... 310/156
3,968,390  7/1976  Yasuda et al. ...................... 310/156
4,117,360  9/1978  Richter ........................... 310/156 X

*Primary Examiner*—Mark O. Budd
*Attorney, Agent, or Firm*—Wenderoth, Lind & Ponack

[57] ABSTRACT

This invention concerns an improvement for the structure of a rotor attachment in a permanent magnet type synchronous motor. This invention can effectively prevent axial displacement or peeling off of the magnets which might otherwise be caused by insufficient adhesion or deterioration of adhesives by the unique structure of attaching magnets to the rotor shaft as side plates having grooves are fixed to both sides of magnets adhered to a shaft to engage with at least one end face of magnets and the outer peripheries of the side plates and the magnets are wound with non-magnetic fibers for securing, thereby greatly enhancing the reliability of the motor.

5 Claims, 7 Drawing Figures

1 MAGNET

PRIOR ART

3 FIXED RING
2 ROTOR SHAFT
1 MAGNET
1 MAGNET

PRIOR ART

5 NON-MAGNETIC FIBER
4 SIDE PLATE
4 SIDE PLATE
1 MAGNET
2 ROTOR SHAFT 4a
4 SIDE PLATE
4a

ROTOR FOR PERMANENT MAGNET TYPE SYNCHRONOUS MOTORS

BACKGROUND OF THE INVENTION

The present invention relates to an improvement in the structure for attaching magnets of a rotor for a synchronous motor of a permanent magnet type.

In the prior art permanent magnet type synchronous motor, a rotor is constructed in such a manner that an even number of permanent 1 magnet in the shape of a column having a sectorial wedge-shaped section as shown in FIG. 1 are adhered around a rotor shaft 2 with an adhesive and are secured by a fixed ring 3 around the outer periphery thereof as shown in FIG. 2. Although the above structure is effective in preventing the magnets from peeling off to outward, when adhesive force becomes weaker by insufficient adhesion or deterioration thereof, repeated start and/or stop of the motor causes inertia sufficient to make the magnets slide circumferentially on the rotor shaft 2. This presents a formidable problem because the motor is often incapacitated for use.

SUMMARY OF THE INVENTION

Accordingly, an object of this invention is to provide a motor of a higher reliability which is free of above mentioned problem. Another object of this invention is to provide a rotor for permanent magnet type synchronous motors in order to prevent the magnets from peeling off to outward, when adhesive force becomes weaker by improper adhesion of adhesives.

Other aspect, objects, and the several advantages of the invention will become apparent to one skilled in the art from a reading of the following disclosure and the appended claims.

DETAILED DESCRIPTION OF THE INVENTION

Figure 1:
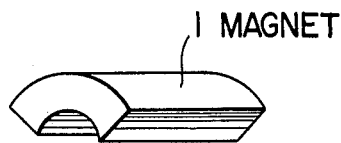
FIG. 1 is a perspective view showing an embodiment of the configuration of a magnet.
Figure 2:
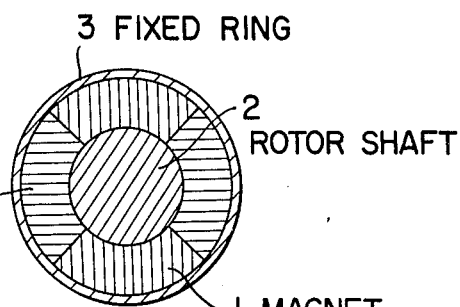
FIG. 2 is a cross sectional view showing the prior art rotor perpendicular to the rotor shaft of a rotor.
Figure 3:
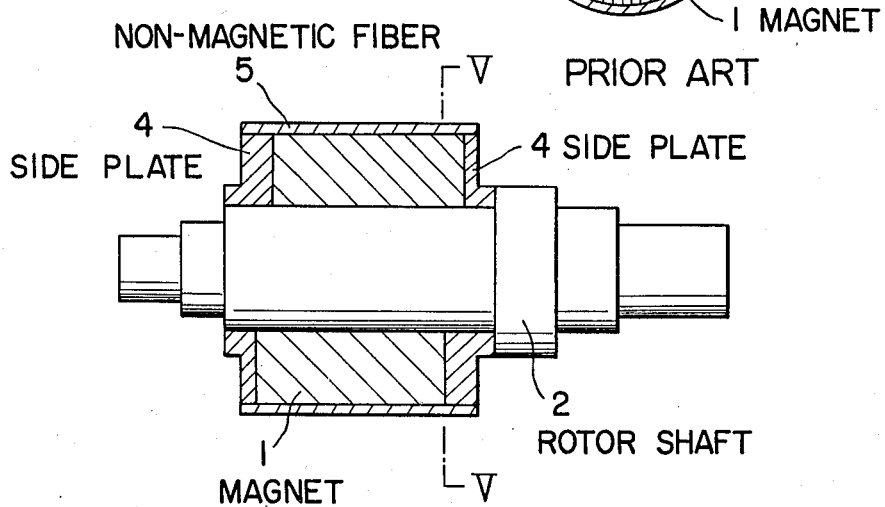
FIG. 3 is a cross sectional view in axial direction of a rotor according to the present invention.
Figure 4:
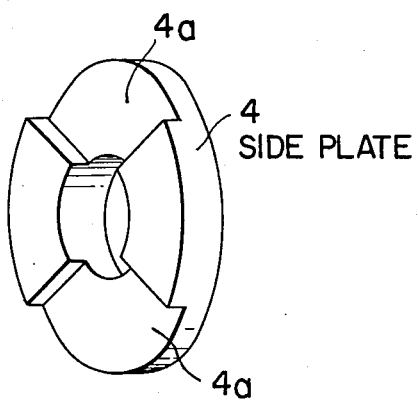
FIG. 4 is a perspective view showing a side plate according to the present invention.
Figure 5:
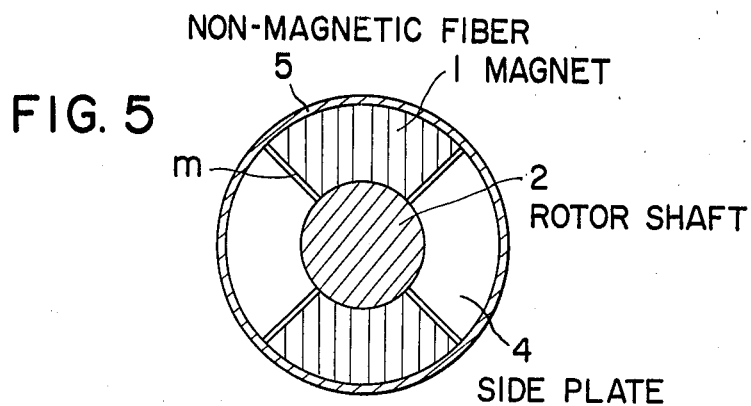
FIG. 5 is a cross sectional view showing the rotor along the line V—V in FIG. 3.

The present invention will now be explained referring to FIGS. 3 through 7. Side plates 4,4 of such non-magnetic materials as stainless steel, aluminum or brass are fixed on a rotor shaft 2 by welding, soldering or force-fitting at an interval to allow columnar permanent magnets 1 having a sectorial section to be inserted therebetween in a manner to prevent circumferential displacement as shown in FIG. 3. Grooves 4a, 4a are formed in recess having the same depth as the height of engaging sectorial ends of the magnets 1 on opposing surfaces of the side plates 4,4 in an alternate number as shown in FIG. 5. In the case of this embodiment, as the number of the magnet is four, the grooves 4a,4a are formed at two positions 180° apart from each other. The grooves preferably have a width to snugly engage with the magnets 1, but if manufacturing tolerance for both engaging parts is made stricter, the manufacturing cost may rise: therefore the width of the grooves 4a,4a is generally made slightly wider than that of the magnets 1. If the grooves 4a,4a on opposing surfaces of both side plates 4,4 are mechanically formed staggered by 90° in phase, the magnets 1 can be made alternately projected on a side of the grooves 4a by the same height. This is advantageous for maintenance of the magnets 1. If the grooves 4a,4a are mechanically in-phase the magnets 1 will comprise two types; that is, one of them is twice as long as the depth of the groove. This may be slightly inconvenient for maintenance but when assembled in a rotor, the dynamic balance will become superior. The magnets 1 are placed between the side plates 4,4 which have been fixed by either one of the above mentioned methods. The magnets 1 are secured by adhering the surfaces which contact the shaft 2 to the shaft 2 and the one contacting the side plates 4 to the plates 4 with an adhesive as well as by injecting resin to the space m which is equivalent to the distance between the side face of the magnet 1 and the wall of the recessed groove 4a. The rotor thus assembled is wound with such non-magnetic fiber 5 as glass fiber, carbon fiber, etc. on the outer periphery thereof and then secured with resin so as to prevent magnets 1 from peeling off.

Figure 6:
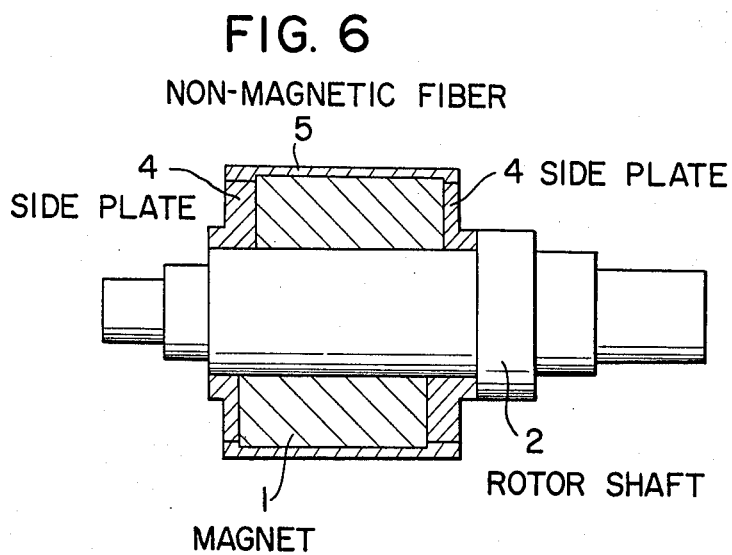
FIGS. 6 and 7 are axial cross sectional views showing other embodiments of the side plate according to the present invention, respectively.
Figure 7:
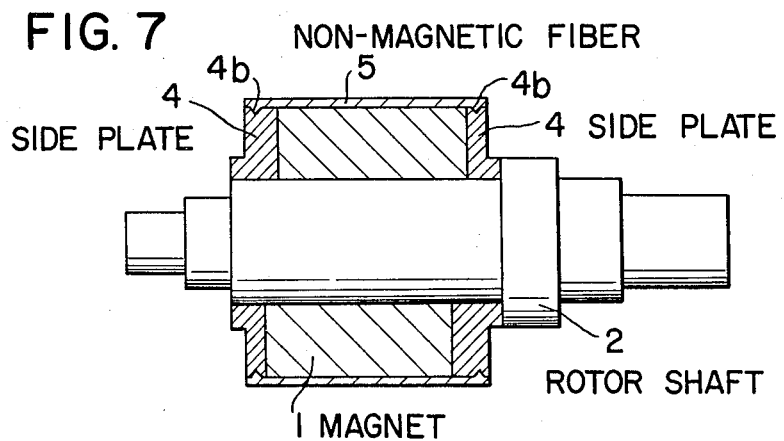

In order to prevent wound fiber 5 from being displaced toward the axial direction during use, the diameter of the outer periphery of side plates 4,4 in another embodiment shown in FIG. 6 is made smaller than that of the magnets 1 so that the non-magnetic fiber 5 encloses a magnet 1 from both sides. The similar effect can be attained by making the outer periphery of the side plates 4,4 slightly larger than that of the magnets 1. The axial displacement of the fiber 5 can be prevented further if an annular groove 4b is provided on the outer periphery of the side plates as shown in FIG. 7 to tuck the fibers therein. Metal is used as the side plates 4,4 in the above mentioned embodiments because of the requirements in strength and in welding or force-fitting. The rotor shaft 2 may be provided with a notch or a groove in the axial direction and strong resinous material configured to engage with such the notch or the groove in inner diameter will be adhered thereto. The rotor shaft 2 may alternatively be provided with a recess and side plates of resinous material will be driven or forced to fit herein and then fixed with an adhesive. Still another alternative to attain side plates which do not slip of slide axially is to project at least one of the end surfaces of the magnets 1, to form a recess on the shaft periphery outside of the magnet ends, to provide templates apart from each other by a distance equivalent to the plates 4,4 and to inject resin such as epoxy in the void space for solidification.

As described in detail in the foregoing, axial displacement or peeling off of the magnets caused by insufficient adhesion or deterioration thereof can be effectively and completely avoided according to the present invention as side plates having grooves are fixed to both sides of the magnets adhered to a shaft to engage with at least one magnet end surface and the outer periphery of the side plates and the magnets are wound with non-magnetic fiber for securing, thereby greatly enhancing the reliability of the machinery.

What is claimed is:

1. A rotor of a permanent magnet type synchronous motor of the type that a plural number of columnar magnets having sectorial cross section are adhered to a rotor shaft on the outer periphery thereof, which is characterized in that end surfaces of at least one of said magnets are made to project in axial direction, that side plates of non-magnetic material having grooves of the same configuration as the section of said magnets are placed on both sides of said magnets so as to engage the grooves with the magnet end surfaces facing thereto and are fixed to said rotor shaft by means which can prevent circumferential displacement, and that the outer periphery of at least said magnets is wound with non-magnetic fibers and secured with resin.

2. The rotor for a permanent magnet type synchronous motor as claimed in claim 1, wherein outer diameter of said side plates is different from outer diameter of said magnets.

3. The rotor for a permanent magnet type synchronous motor as claimed in claim 1, wherein said side plates are provided with grooves on the outer periphery thereof.

4. The rotor for a permanent magnet type synchronous motor as claimed in claim 1, wherein said side plates are made of metal.

5. The rotor for a permanent magnet type synchronous motor as claimed in claim 1, wherein said side plates are made of resin.

* * * * *